United States Patent
Moritz

(10) Patent No.: US 7,263,190 B1
(45) Date of Patent: Aug. 28, 2007

(54) SYSTEM FOR SECURING THE CONFIDENTIALITY OF ELECTRONICALLY STORED DATA IN THE EVENT OF THE PHYSICAL THEFT THEREOF

(75) Inventor: Elan Moritz, Lynn Haven, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 687 days.

(21) Appl. No.: 10/828,523

(22) Filed: Apr. 6, 2004

(51) Int. Cl.
*H04K 1/00* (2006.01)

(52) U.S. Cl. .................. 380/258; 713/193; 713/194; 726/35

(58) Field of Classification Search ............. 713/193, 713/194; 726/35; 380/258
See application file for complete search history.

(56) References Cited

U.S. PATENT DOCUMENTS

| | | | | |
|---|---|---|---|---|
| 4,325,089 A | * | 4/1982 | Hsu ........................... 360/15 |
| 5,323,464 A | * | 6/1994 | Elander et al. ............. 713/191 |
| 5,790,074 A | * | 8/1998 | Rangedahl et al. .... 342/357.13 |
| 7,099,110 B2 | * | 8/2006 | Detzler ..................... 360/97.02 |
| 7,131,145 B2 | * | 10/2006 | Ng et al. ...................... 726/34 |
| 2003/0204739 A1 | * | 10/2003 | Ng et al. ..................... 713/194 |
| 2004/0264027 A1 | * | 12/2004 | Nishio ......................... 360/60 |

* cited by examiner

*Primary Examiner*—Nasser Moazzami
*Assistant Examiner*—Daniel Hoang
(74) *Attorney, Agent, or Firm*—James T. Shepherd

(57) ABSTRACT

To secure the confidentiality of data stored in data storage devices, a position determination system is mechanically coupled to the data storage devices and continuously determines a position thereof. A processor, provided with an authorized location for the data storage devices, facilitates transfer of data to and from the data storage devices. Specifically, when the position of the data storage devices matches the authorized location, the processor facilitates transfer of data from the data storage devices without any modification of the data. However, when the position of the data storage means does not match the authorized location, the processor inflates the data by dispersing it in a very large set of irrelevant data.

20 Claims, 2 Drawing Sheets

SYSTEM FOR SECURING THE CONFIDENTIALITY OF ELECTRONICALLY STORED DATA IN THE EVENT OF THE PHYSICAL THEFT THEREOF

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "DATA INFLATION FOR MASKING VALUABLE DATA" (Navy Case No. 96150), by the same inventor as this patent application.

FIELD OF THE INVENTION

The invention relates generally to security systems for electronic data, and more particularly to a system that provides for the electronic storage of data and for security of the confidentiality thereof in the event that the system and/or stored data is physically removed or stolen from an authorized location.

BACKGROUND OF THE INVENTION

Companies, organizations and civilian/military government entities often have electronic data repositories for storage of critical and/or sensitive data. The data repositories can be static storage facilities for archiving data storage devices, or dynamic storage facilities that provide for the electronic transfer of data into and out of data storage devices. In either case, the data storage devices are typically maintained in a physical location that is secured utilizing one or more conventional "secure facility" systems such as locked rooms/buildings, security checks for personnel having authorized access to the secure facility, alarm systems, etc. However, if access is gained to the secure facility, it is often easy to physically remove or steal the data storage devices maintained in the secure facility. Given the current state-of-the-art in data storage device capacity, it is conceivable that one individual can walk off with large amounts of critical and/or sensitive data in a coat pocket. Once in possession of these data storage devices, the thief can access the secret or confidential data thereon at his leisure using his own processing equipment. Even if the stored confidential data is encrypted for security, most (if not all) encryption routines can be "cracked" given enough time and sufficient computing power.

SUMMARY OF THE INVENTION

Accordingly, it is an object of the present invention to provide a system for securing the confidentiality of electronically stored data in the event of a physical theft thereof.

Other objects and advantages of the present invention will become more obvious hereinafter in the specification and drawings.

In accordance with the present invention, a system secures the confidentiality of data stored in data storage devices. A position determination system is mechanically coupled to the data storage devices and continuously determines a position thereof. A processor is electrically coupled to the data storage devices and the position determination system. The processor is further provided with an authorized location for the data storage devices. The processor facilitates transfer of data to and from the data storage devices. More specifically, when the position of the data storage devices matches the authorized location, the processor facilitates transfer of data from the data storage devices without any modification of the data. However, when the position of the data storage means does not match the authorized location, the processor modifies the data transferred from the data storage devices by (i) parsing the data to be transferred from the data storage devices into constituents thereof, and (ii) randomly incorporating the constituents into a set of irrelevant data having storage requirements that exceed those of the data to be transferred by a plurality of orders of magnitude.

The system can further include sensors coupled to the data storage devices for sensing attempts to physically move the data storage means devices. Should this happen, the sensors generate a control signal that is used to activate a self-destruction system coupled to the data storage devices. Still further, the system can include alarms and/or a transmitter. The alarms can be activated when the position of the data storage devices does not match the authorized location and/or when the sensors detect movement of the data storage devices. The transmitter wirelessly transmits the position of the data storage devices when the position of the data storage devices does not match the authorized location and/or when the sensors detect movement of the data storage devices.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
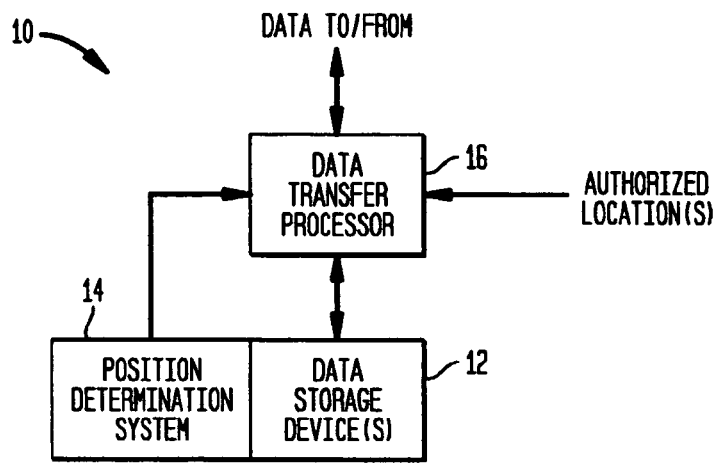
FIG. 1 is a block diagram of one embodiment of a system for securing the confidentiality of electronically stored data in the event of a physical theft thereof in accordance with the present invention.

Referring now to the drawings, and more particularly to FIG. 1, a block diagram of a first embodiment of a system for securing the confidentiality of electronically stored data in the event of a physical theft thereof in accordance with the present invention is shown and is referenced generally by numeral 10. As used herein, the term "physical theft" refers to a physical taking by which the system and/or the device(s) used to electronically store data are physically moved from their intended or authorized location.

System 10 includes one or more data storage devices 12, a position determination system 14 attached or otherwise mechanically coupled to data storage device(s) 12, and a data transfer processor 16 having a data inflation processing scheme programmed therein. Data storage device(s) 12 can be any data storage medium used to electronically store data. Such data storage media include but are not limited to chip-based read only memory (ROM) or random access memory (RAM), magnetic disks, compact disks (CDs), digital video disks (DVDs), etc. Further, a variety of format (s) can be used to store and/or encrypt the stored data without departing from the scope of the present invention.

Position determination system 14 will generally include a Global Positioning System (GPS) receiver, and can include localized position determination devices such as an inertial system or ring laser gyro element.

Data transfer processor 16 can be any type of processor that can be used to control the transfer of data to and from data storage device(s) 12. In general, data transfer processor 16 controls authorized data transfers to and from data storage device(s) 12 in any of a variety of ways that would be well understood in the art. In addition, data transfer processor 16 is programmed with one or more "data inflation" schemes that greatly inflates stored data that is being electronically extracted/copied from device(s) 12 in the event of unauthorized removal or physical theft of system 10.

Briefly, a "data inflation" scheme referred to herein modifies the data as it is being extracted/copied (from data storage device(s) 12) by (i) dividing or parsing the data being extracted/copied into its constituent parts with the size of the parts being the same or different; and (ii) randomly incorporating the constituent parts into a very large set of irrelevant data that can be generated in real-time by data transfer processor 16.

In general, the size of a constituent part of the data should be small enough such that it does not represent any recognizable part of the data. The size of the set of irrelevant data is preferably substantially larger (i.e., a number of orders of magnitude) than the size of the data being extracted/copied. For example, each kilobyte of stored data being extracted/copied could be divided up and intermixed (by data transfer processor 16) with 100 gigabytes of irrelevant data generated by data transfer processor 16. This means that a 1 megabyte stored data file would generate 100,000 gigabytes of inflated data. Note that the actual amount of data inflation could be more or less than this example without departing from the scope of the present invention.

The particular scheme used to generate a large, irrelevant data set is not a limitation of the present invention as any one of a number of such schemes could be used herein without departing from the scope of the present invention. For example, a large irrelevant data set of numbers could be generated using a system calendar and clock maintained on data transfer processor 16. More specifically, assume that I is an elapsed time in seconds from some arbitrary start time on a system clock and D is a number of days since some reference date. A simple algorithm could then be used to generate a large set of random numbers using D and I. For example, one could start with some transcendentally-derived number such as the D-th root of "pi" raised to the I-th power. The system would then mix each digit of the stored data with a different $10^8$ digits (i.e., 100 gigabytes) of the generated irrelevant data set. Another way of generating the irrelevant data set would be to take the D-th root of an arbitrary irrational number raised to the I-th power. Data inflation could be completed by converting the stored data to numbers and randomly inserting same into the generated set of irrelevant (number) data.

Data inflation as described herein serves two purposes. First, the time/bandwidth requirements for downloading enormous data files will greatly tax an unauthorized user or thief's system. Second, the large set of generated irrelevant data will mask the real data which has been parsed into constituent parts. Thus, even if a thief has the capability to download and store the inflated data, it must then be "deflated" and have the data of interest separated from the irrelevant data.

In operation, data transfer processor 16 is provided or programmed with one or more authorized locations. Position determination system 14 continuously determines its position and, therefore, the position of data storage device(s) 12. The determined position is compared with the authorized location(s). A match between the two means that system 10 and data storage device(s) 12 are where they should be. In such a case, requests for data (which, for purposes of the present invention, are assumed to be properly authorized) are handled by data transfer processor 16 without any data modification. However, if there is disagreement between the authorized location(s) and the determined position, data transfer processor 16 implements its data inflation scheme for any subsequent data extraction/copying attempts.

Figure 2:
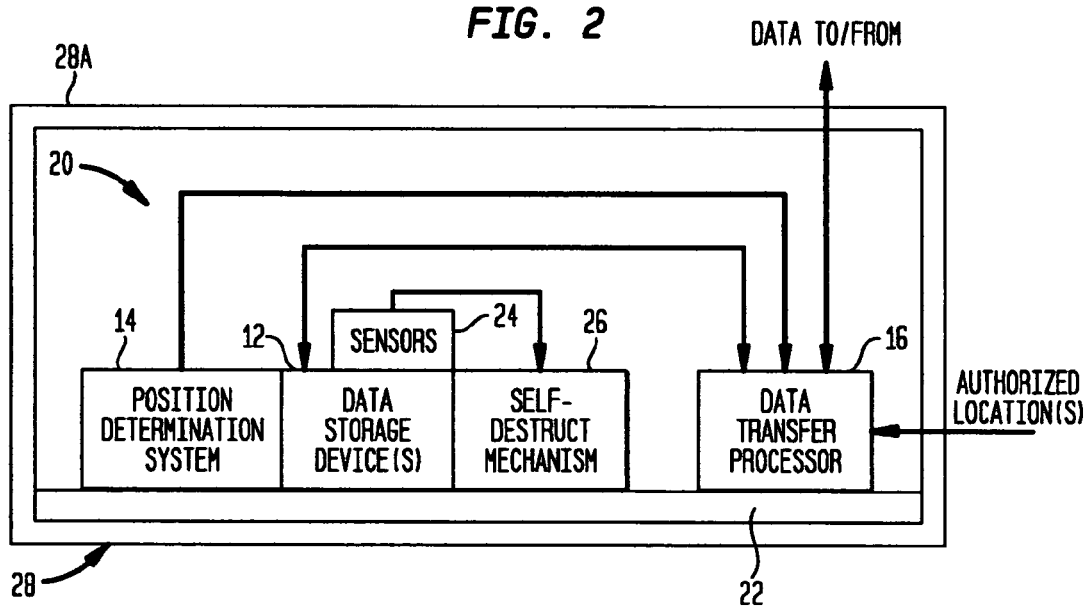
FIG. 2 is another embodiment of the present invention that includes a self-destruct mechanism used to secure the confidentiality of the data in the event that attempts are made to remove the system's data storage device(s) from the system.

It is possible that a thief may attempt to just take data storage device(s) 12. This may be especially true where the system to which the data storage device(s) are coupled is too large/heavy to be moved from its authorized location. For example, FIG. 2 illustrates a system 20 that includes a platform 22 (e.g. cabinet, floor, shelf, etc.) to which data storage device(s) 12, position determination system 14 and, optionally, data transfer processor 16 are mechanically coupled. Each of device(s) 12, system 14 and processor 16 operates as described hereinabove. System 20 further includes one or more sensors 24 coupled to data storage device(s) 12 for sensing any attempts to remove device(s) 12 from platform 22. Accordingly, sensors 24 can include motion sensors, contact switches, and combinations thereof, to detect such removal attempts. In the event that a removal attempt is detected, sensors 24 generate a control signal used to activate a self-destruct mechanism 26 coupled to data storage device(s) 12. Self-destruct mechanism 26 can be configured to, upon activation, destroy one or both of data storage device(s) 12 and the data stored thereon. The type of self-destruct mechanism can be any of a variety of such mechanisms without departing from the scope of the present invention. For example, if device(s) 12 are a magnetic storage media, self-destruct mechanism 26 might be an electromagnet. Other possibilities for self-destruct mechanism 26 include, but are not limited to, small incendiary devices that can burn or melt device(s) 12 or the storage media, a pressurized container of corrosive or highly oxidizing fluid or gas, a binary explosive system in which components react when brought into contact with one another, or a mechanical device designed to scratch the storage media beyond readability.

Another option is to encase system 20 in a secure container or vault 28 so that theft of system 20 essentially requires theft of the entirety of vault 28. Still further, for blast and/or fire protection, the sides, top and bottom of vault 28 can have blast and heat shields 28A affixed thereto.

Figure 3:
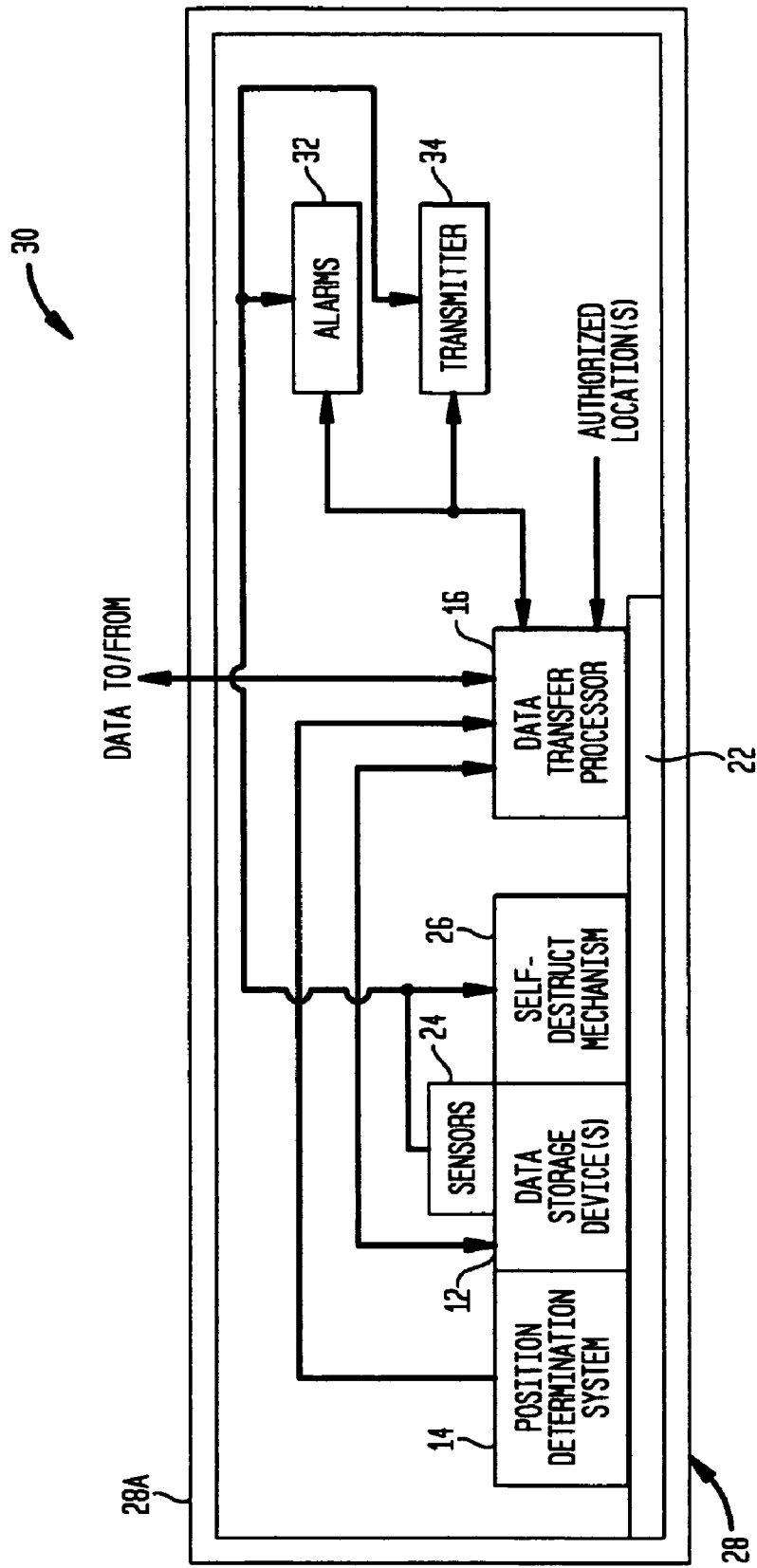
FIG. 3 is still another embodiment of the present invention that includes alarm(s) and/or a transmitter for generating alarm(s) and/or position signals, respectively, in the event of a physical theft of the entire system or if attempts are made to remove the system's data storage device(s).

Still another embodiment of the present invention is shown in FIG. 3 where a system 30 includes all of the elements of system 20 (to optionally include vault 28 with shields 28A), and further includes one or more alarms 32 and a transmitter 34. Alarms 32 can be coupled to data transfer processor 26 for activation when data storage device(s) 12 are not in an authorized location. Additionally or alternatively, alarms 32 can be coupled to sensors 24 for activation when sensors 24 detect any attempt to remove data storage device(s) 12 from platform 22 and/or vault 28. The types of alarms 32 can include one or more of audio alarms, video alarms, and "silent" alarms that are audible/visible at a remote location, without departing from the scope of the present invention. Transmitter 34 can be coupled to data transfer processor 16 to transmit the position determined by system 14. The transmission is preferably a wireless transmission. The position transmission could occur continuously, periodically, or only when system 30 is not in an authorized location or when sensors 24 detect an attempt to remove data storage device(s) 12 from platform 22. Thus, system 30 not only secures the confidentiality of data stored on device(s) 12, but also provides the means to retrieve a stolen system 30 and, possibly, provide the authorities with the means to apprehend those responsible for such theft or attempted theft.

The advantages of the present invention are numerous. The system secures the confidentiality of stored data when the entire system is moved from an authorized location. Further, the system secures the confidentiality of stored data when attempts are made to steal just the devices on which the data is stored.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for securing the confidentiality of electronically stored data, comprising:
   data storage means for electronically storing data;
   position determination means mechanically coupled to said data storage means for continuously determining a position thereof;
   processor means electrically coupled to said data storage means and said position determination means, said processor means provided with an authorized location for said data storage means, said processor means facilitating transfer of said data to and from said data storage means wherein
   when said position of said data storage means matches said authorized location, said processor means facilitates transfer of said data from said data storage means without any modification of said data, and wherein
   when said position of said data storage means does not match said authorized location, said processor means modifies said data transferred from said data storage means by parsing said data to be transferred from said data storage means into constituents thereof and randomly incorporating said constituents into a set of irrelevant data having storage requirements that exceed those of said data to be transferred by a plurality of orders of magnitude.

2. A system as in claim 1 further comprising at least one alarm device coupled to said processor means for generating an alarm signal when said position of said data storage means does not match said authorized location.

3. A system as in claim 1 further comprising a transmitter coupled to said processor means for wirelessly transmitting said position of said data storage means when said position of said data storage means does not match said authorized location.

4. A system as in claim 1 further comprising a secure container for housing said data storage means, said position determination means and said processor means.

5. A system as in claim 4 wherein said secure container includes heat and blast shielding means.

6. A system as in claim 1 further comprising:
   at least one sensor coupled to said data storage means for sensing attempts to physically move said data storage means for generating a control signal indicative thereof; and
   destruction means coupled to said at least one sensor and said data storage means for destroying at least one of (i) said data storage means and (ii) said data stored on said data storage means, in response to generation of said control signal.

7. A system as in claim 6 further comprising at least one alarm device coupled to said at least one sensor for generating an alarm signal in response to generation of said control signal.

8. A system as in claim 6 further comprising a transmitter coupled to said at least one sensor for wirelessly transmitting said position of said data storage means in response to generation of said control signal.

9. A system as in claim 1 wherein said position determination means includes a Global Positioning System (GPS) receiver.

10. A system for securing the confidentiality of electronically stored data, comprising:
    a secure container;
    data storage means housed in said secure container for electronically storing data;
    position determination means housed in said secure container for continuously determining a position of said secure container;
    processor means housed in said secure container and electrically coupled to said data storage means and said position determination means, said processor means provided with an authorized location for said secure container, said processor means facilitating transfer of said data to and from said data storage means wherein
    when said position of said secure container matches said authorized location, said processor means facilitates transfer of said data from said data storage means without any modification of said data, and wherein
    when said position of said secure container does not match said authorized location, said processor means modifies said data transferred from said data storage means by parsing said data to be transferred from said data storage means into constituents thereof and randomly incorporating said constituents into a set of irrelevant data having storage requirements that exceed those of said data to be transferred by a plurality of orders of magnitude;
    at least one sensor coupled to said data storage means for sensing attempts to physically remove said data storage means from said secure container and for generating a control signal indicative thereof; and
    destruction means coupled to said at least one sensor and said data storage means for destroying at least one of (i) said data storage means and (ii) said data stored on said data storage means, in response to generation of said control signal.

11. A system as in claim 10 further comprising at least one alarm device coupled to said processor means for generating an alarm signal when said position of said secure container does not match said authorized location.

12. A system as in claim 10 further comprising a transmitter coupled to said processor means for wirelessly transmitting said position of said secure container when said position of said secure container does not match said authorized location.

13. A system as in claim 10 wherein said secure container includes heat and blast shielding means.

14. A system as in claim 10 further comprising at least one alarm device coupled to said at least one sensor for generating an alarm signal in response to generation of said control signal.

15. A system as in claim 10 further comprising a transmitter coupled to said at least one sensor for wirelessly transmitting said position of said secure container in response to generation of said control signal.

16. A system as in claim 10 wherein said position determination means includes a Global Positioning System (GPS) receiver.

17. A system for securing the confidentiality of electronically stored data, comprising:
   a platform;
   data storage means mechanically coupled to said platform for electronically storing data;
   position determination means mechanically coupled to said platform for continuously determining a position of said platform;
   processor means electrically coupled to said data storage means and said position determination means, said processor means provided with an authorized location for said platform, said processor means facilitating transfer of said data to and from said data storage means wherein
      when said position of said platform matches said authorized location, said processor means facilitates transfer of said data from said data storage means without any modification of said data, and wherein
      when said position of said platform does not match said authorized location, said processor means modifies said data transferred from said data storage means by parsing said data to be transferred from said data storage means into constituents thereof and randomly incorporating said constituents into a set of irrelevant data having storage requirements that exceed those of said data to be transferred by a plurality of orders of magnitude;
   at least one sensor coupled to said data storage means for sensing attempts to physically remove said data storage means from said platform and for generating a control signal indicative thereof;
   destruction means coupled to said at least one sensor and said data storage means for destroying at least one of (i) said data storage means and (ii) said data stored on said data storage means, in response to generation of said control signal;
   at least one alarm device coupled to (i) said processor means for generating an alarm signal when said position of said platform does not match said authorized location, and (ii) said at least one sensor for generating an alarm signal in response to generation of said control signal; and
   a transmitter coupled to (i) said processor means for wirelessly transmitting said position of said platform when said position of said platform does not match said authorized location, and (ii) said at least one sensor for wirelessly transmitting said position of said platform in response to generation of said control signal.

18. A system as in claim 17 further comprising a secure container for housing said platform, said data storage means, said position determination means, said processor means, said at least one sensor, said destruction means, said at least one alarm device and said transmitter.

19. A system as in claim 18 wherein said secure container includes heat and blast shielding means.

20. A system as in claim 17 wherein said position determination means includes a Global Positioning System (GPS) receiver.

* * * * *